UNITED STATES PATENT OFFICE.

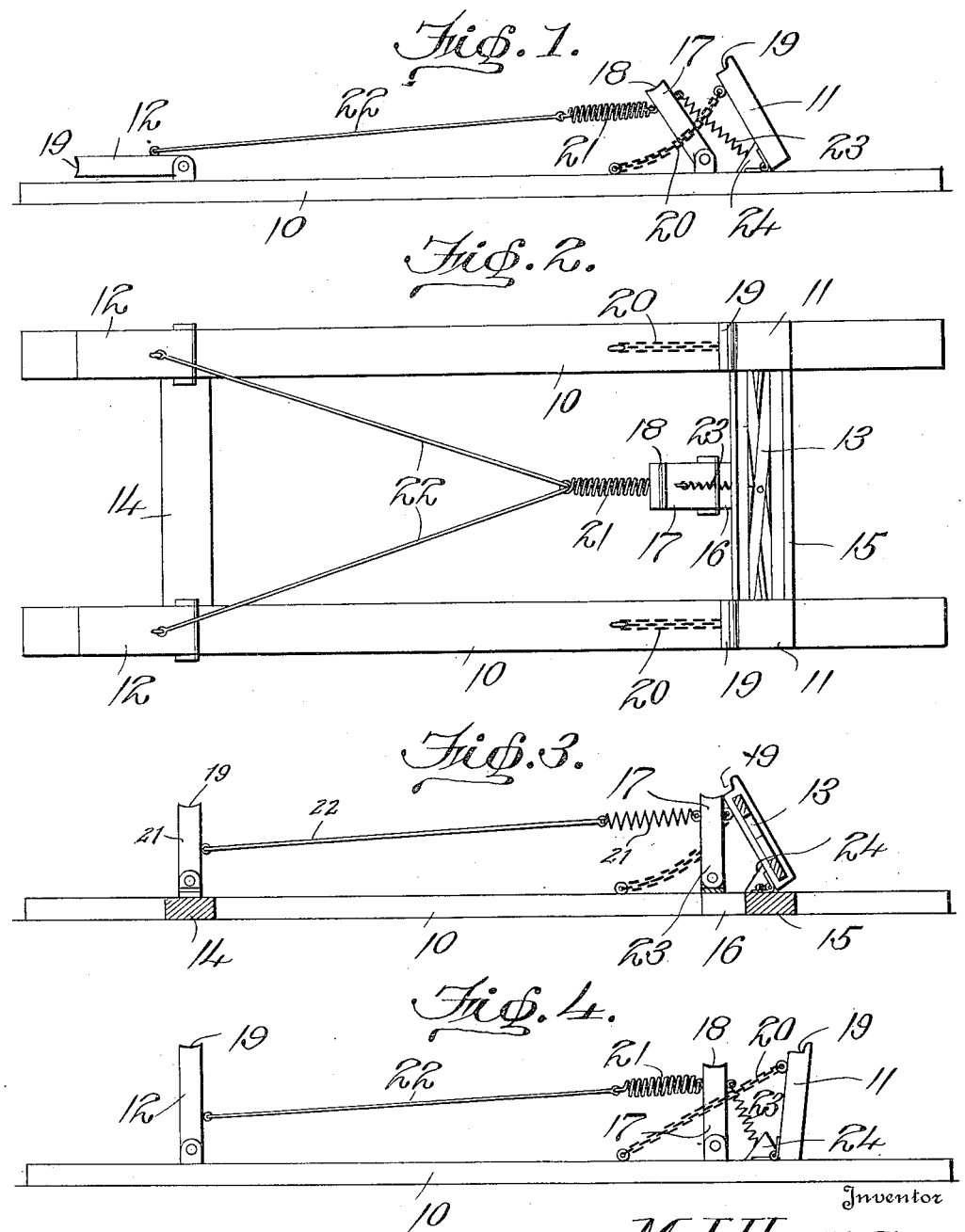

MARTIN J. HAUG, OF MADELIA, MINNESOTA.

AUTOMOBILE-JACK.

1,224,298.

Specification of Letters Patent.

Patented May 1, 1917.

Application filed October 9, 1916. Serial No. 124,714.

*To all whom it may concern:*

Be it known that I, MARTIN J. HAUG, a citizen of the United States, residing at Madelia, in the county of Watonwan, State of Minnesota, have invented certain new and useful Improvements in Automobile-Jacks; and I do hereby declare the following to be a full, clear, and exact description of the invention, such as will enable others skilled in the art to which it appertains to make and use the same.

This invention relates to improvements in jacks and particularly to automobile jacks.

One object of the present invention is to provide a novel and improved construction of jack which is automatic in its operation to raise an automobile from the ground when the automobile is run over the same.

Another object is to provide a novel and simple means for raising the rear lifting members when the front members are engaged by the front axle of the automobile so that both the front and rear of the car will be raised at the same time.

Other objects and advantages will be apparent from the following description when taken in connection with the accompanying drawing.

In the drawing:

Figure 1 is a side elevation of a jack made in accordance with my invention.

Fig. 2 is a top plan view of the same.

Fig. 3 is a longitudinal sectional view on the line 3—3 of Fig. 2.

Fig. 4 is a longitudinal sectional view showing the position of the parts when the automobile is lifted thereon.

Referring particularly to the accompanying drawing 10—10 represent a pair of elongated base members arranged in parallel relation. Pivotally mounted on the opposite ends of each of the base members, respectively, are the vertically movable lifting blocks 11 and 12. The members 11 are connected together by means of the crossed braces 13, whereby the said blocks will move upwardly and downwardly in unison. Transverse bars 14 and 15 are secured to and extend between the respective ends of the base members, and pivotally mounted on the longitudinally extending foot 16, which is carried by the intermediate portion of the bar 15, is a vertical trip member or arm 17, the upper end being notched, as shown at 18. The upper end of each of the blocks 11 and 12 is similarly notched, as shown at 19, all for a purpose which will appear later. Connected to the inner portions of the upper ends of the blocks 11, at one end and at their other ends to the base members, are the comparatively heavy chains 20, which prevent the movement of the blocks 11 too far in one direction, as will be more clearly set forth in the description of the operation.

Connected to the upper end of the trip member is a coil spring 21, and connected to the other end of this spring are two wire cables 22 which extend to and are secured to the blocks 12 at suitable distances from the upper ends thereof. A second spring 23 is secured to the other side of the trip member and to the before-mentioned foot 16, said spring serving to hold the trip member normally in approximately vertical position.

In normal position the rear blocks 12 are in completely lowered position while the front blocks are leaning rearwardly against the blocks 24. The automobile is driven over the base members, with the wheels outside thereof, until the front axle engages with the trip member. As the car moves forward the front axle swings the trip member on its pivot, and by means of the connecting cables or wires 22 the rear blocks 12 are raised to a point whereby the rear axle will engage in the notches 19 of the blocks 11. The trip member will move farther forward and by its engagement with the connecting members or braces 13 of the front blocks, these blocks will be moved forward also, the front axle, in the meantime engaging in the notches 19 of the blocks 11. Thus both axles are engaged with the blocks and as the car is moved farther forward the car will be lifted from the ground and be supported by said blocks. The front blocks will move forwardly beyond the vertical position but be limited in this movement by the chains 20, said chains thus holding the weight of the car and preventing the same from swinging forwardly onto the ground again. When the car is to be lowered, the car is given a slight push rearwardly so as to swing the blocks rearwardly of the perpendicular, when the car will settle down onto the ground.

What is claimed is:

An automobile jack comprising a base, axle engaging and lifting blocks movably mounted on opposite ends of the base, a movably mounted trip member mounted adjacent one set of said lifting blocks, connecting means between the blocks of said set, said trip member being arranged to be moved by one of the axles of an automobile into engagement with said connecting means to swing said blocks on their pivots as the said axle engages with said blocks, and connecting means between the trip member and the other set of blocks whereby said last-named blocks will be raised into position to be engaged by the other axle of the automobile upon the engagement of the first axle with the first blocks.

In testimony whereof, I affix my signature, in the presence of two witnesses.

MARTIN J. HAUG.

Witnesses:
C. J. EIDE,
E. O. HAUG.